(12) United States Patent
Nishikawa

(10) Patent No.: US 10,555,512 B2
(45) Date of Patent: Feb. 11, 2020

(54) SPINNING REEL

(71) Applicant: Shimano Inc., Sakai, Osaka (JP)

(72) Inventor: Tomohiro Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/409,089

(22) Filed: May 10, 2019

(65) Prior Publication Data

US 2020/0008411 A1    Jan. 9, 2020

(30) Foreign Application Priority Data

Jul. 6, 2018 (JP) ................................. 2018-128932

(51) Int. Cl.
*A01K 89/01* (2006.01)
*A01K 89/015* (2006.01)
*A01K 89/027* (2006.01)

(52) U.S. Cl.
CPC .... *A01K 89/01902* (2015.05); *A01K 89/0111* (2013.01); *A01K 89/0188* (2015.05); *A01K 89/01127* (2015.05); *A01K 89/01142* (2015.05); *A01K 89/029* (2015.05)

(58) Field of Classification Search
CPC .......... A01K 89/0114; A01K 89/01142; A01K 89/0117
See application file for complete search history.

(56) References Cited

U.S. PATENT DOCUMENTS

| 2001/0042804 A1* | 11/2001 | Kawabe | A01K 89/0114 |
| | | | 242/273 |
| 2004/0079821 A1* | 4/2004 | Kitajima | A01K 89/01 |
| | | | 242/311 |
| 2016/0262362 A1* | 9/2016 | Takechi | A01K 89/01 |

FOREIGN PATENT DOCUMENTS

JP          3480799 B2    10/2003

\* cited by examiner

*Primary Examiner* — Emmanuel M Marcelo
(74) *Attorney, Agent, or Firm* — Global IP Counselors, LLP

(57) ABSTRACT

A spinning reel includes a reel body, a handle, a spool shaft, a spool, a rotor, a reciprocating mechanism, and a clutch mechanism. The handle is rotatably disposed on the reel body. The spool shaft is supported by the reel body. The spool moves in an axial direction of the spool shaft together with the spool shaft. The rotor rotates about the spool by rotation of the handle and winds a fishing line around the spool. The reciprocating mechanism moves the spool shaft back and forth in the axial direction when the rotation of the handle is transmitted thereto. The clutch mechanism switches between a transmitting state to transmit the rotation of the handle to the reciprocating mechanism and a non-transmitting state to terminate the transmission. The reciprocating mechanism enables the spool shaft to move in the axial direction when the clutch mechanism is in the non-transmitting state.

9 Claims, 6 Drawing Sheets

SPINNING REEL

CROSS-REFERENCE TO RELATED APPLICATIONS

This application claims priority to Japanese Patent Application No. 2018-128932, filed on Jul. 6, 2018. The entire disclosure of Japanese Patent Application No. 2018-128932 is hereby incorporated herein by reference.

BACKGROUND

Field of the Invention

The present invention relates to a fishing reel, in particular to a spinning reel.

Background Art

In a conventional fishing reel, particularly a spinning reel, a rotor rotates about a spool by rotation of a handle, and a fishing line is thereby wound around the spool. In addition, the spinning reel comprises a reciprocating mechanism for evenly winding the fishing line around the spool. When the rotation of the handle is transmitted to the reciprocating mechanism, the spool moves back and forth in the axial direction, and the fishing line is evenly wound around the spool via a rotor.

In these spinning reels, there are cases in which the fishing line comes into contact with the rotor during casting, thereby decreasing the flight distance. For this reason, it is preferable to move the spool to the foremost position when casting. However, it is necessary to rotate the handle in order to move the position of the spool by the reciprocating mechanism. Since the hanging length from the distal end of a fishing rod to the tackle changes when the handle is rotated, it becomes difficult to cast with the optimal hanging length. Therefore, for example, Japanese Patent No. 3480799 described above discloses an invention for moving the position of the spool without substantially changing the hanging length of the tackle.

SUMMARY

An object of the present invention is to make it possible to adjust the position of the spool relative to the rotor without substantially changing the hanging length of the fishing line when casting.

A spinning reel according to one aspect of the present invention comprises a reel body, a handle, a spool shaft, a spool, a rotor, a reciprocating mechanism, and a clutch mechanism. The handle is disposed on the reel body so as to be rotatable. The spool shaft is supported by the reel body. The spool moves in the axial direction of the spool shaft together with the spool shaft. The rotor rotates about the spool by the rotation of the handle and winds the fishing line around the spool. When the rotation of the handle is transmitted, the reciprocating mechanism moves the spool shaft back and forth in the axial direction. The clutch mechanism is capable of being switched between a transmitting state for transmitting the rotation of the handle to the reciprocating mechanism and a non-transmitting state for terminating the transmission. The reciprocating mechanism allows the spool shaft to move in the axial direction when the clutch mechanism is in the non-transmitting state.

By this spinning reel, it is possible to move the spool shaft in the axial direction without rotating the handle when the clutch mechanism is in the non-transmitting state. As a result, it is possible to adjust the position of the spool relative to the rotor without substantially changing the hanging length of the tackle. That is, even if the spool is moved to the foremost position during casting, the hanging length of the tackle changes only by the distance that the spool is moved forward. As a result, it is possible to cast with the optimal hanging length of the tackle and to suppress contact of the fishing line with the rotor during casting.

Preferably, the reciprocating mechanism includes a shaft member, a first pulley, a second pulley, a rotation transmission body, and a moving body. The shaft member receives the rotation of the handle, extends in a direction intersecting the spool shaft, and is rotatably supported by the reel body. The first pulley is rotatably supported by the shaft member and receives the rotation of the handle when the clutch mechanism is in the transmitting state. The second pulley is disposed spaced apart from the first pulley in the axial direction of the spool shaft. The rotation transmission body is bridged between the first pulley and the second pulley and moves with circular motion as the first pulley rotates. The moving body engages with the rotation transmission body and integrally moves back and forth in the axial direction with the spool shaft as the rotation transmission body moves in circular fashion. Since it is possible to adjust the position of the spool relative to the rotor without substantially changing the hanging length of the tackle in this embodiment as well, it is possible to achieve the same effect as described above. In addition, because the moving body moves back and forth as the rotation transmission body moves with a circular motion, for example, compared to a case in which the moving body is moved back and forth by the rotation of a worm shaft, in which a spiral groove is formed, it is possible to form the clutch mechanism with a simple configuration. In addition, when the clutch mechanism is in the non-transmitting state, it is possible to adjust the position of the spool relative to the rotor without a complex operation, such as rotating the worm shaft.

Preferably, a first gear to which the handle transmits rotation and that is capable of being rotated about the axis of the shaft member is further provided, wherein the first pulley rotates integrally with the shaft member and the clutch mechanism is disposed between the first gear and the shaft member.

Preferably, an operation member for switching between the transmitting state and the non-transmitting state of the clutch mechanism is further provided, the clutch mechanism including a connecting member that is supported by the shaft member so as to be integrally rotatable and that moves between a first position, in which the connecting member is connected with the first gear so as to be integrally rotatable, and a second position, in which the connection with the first gear is released, in accordance with an operation of the operation member.

Preferably, a biasing member that is mounted on the shaft member and that biases the connecting member of the clutch mechanism toward the first position is further provided.

Preferably, the first gear has a housing hole portion that can accommodate the connecting member when the clutch mechanism is in the non-transmitting state and an engagement recess that is continuously formed with the housing hole portion, wherein the connecting member of the clutch mechanism has an engagement protrusion that engages with the engagement recess of the first gear. In this embodiment, the clutch mechanism can be formed having a simple configuration.

Preferably, the operation member includes a lever member that is disposed in the reel body so as to be movable and a moving member that moves the connecting member in accordance with a movement of the lever member. In this embodiment, it is possible to easily switch the clutch mechanism with the lever member.

Preferably, the connecting member is integrally disposed on the operation member. In this embodiment, the clutch mechanism and the operation member can be formed having a simple configuration.

Preferably, a driven gear that is supported by the reel body so as to be rotatable and that engages the first gear to transmit the rotation of the handle to the first gear is further provided, and the first gear decelerates and transmits the rotation of the driven gear to the first pulley via the shaft member.

By the present invention, it is possible to adjust the position of the spool relative to the rotor without substantially changing the hanging length of the fishing line during casting.

DETAILED DESCRIPTION OF THE EMBODIMENT

In the following description, the direction in which the fishing line is unreeled (cast) during fishing is referred to as the front, and the opposite direction is referred to as the back. In addition, when the reel body 2 is mounted on a fishing rod, the side onto which the fishing rod is attached is referred to as the upper side and the opposite side is referred to as the lower side. Further, left and right mean left and right when the spinning reel 100 is viewed from the rear. In addition, the direction in which spool shaft 3 (refer to FIG. 2) extends is referred to as the "axial direction."

Figure 1:
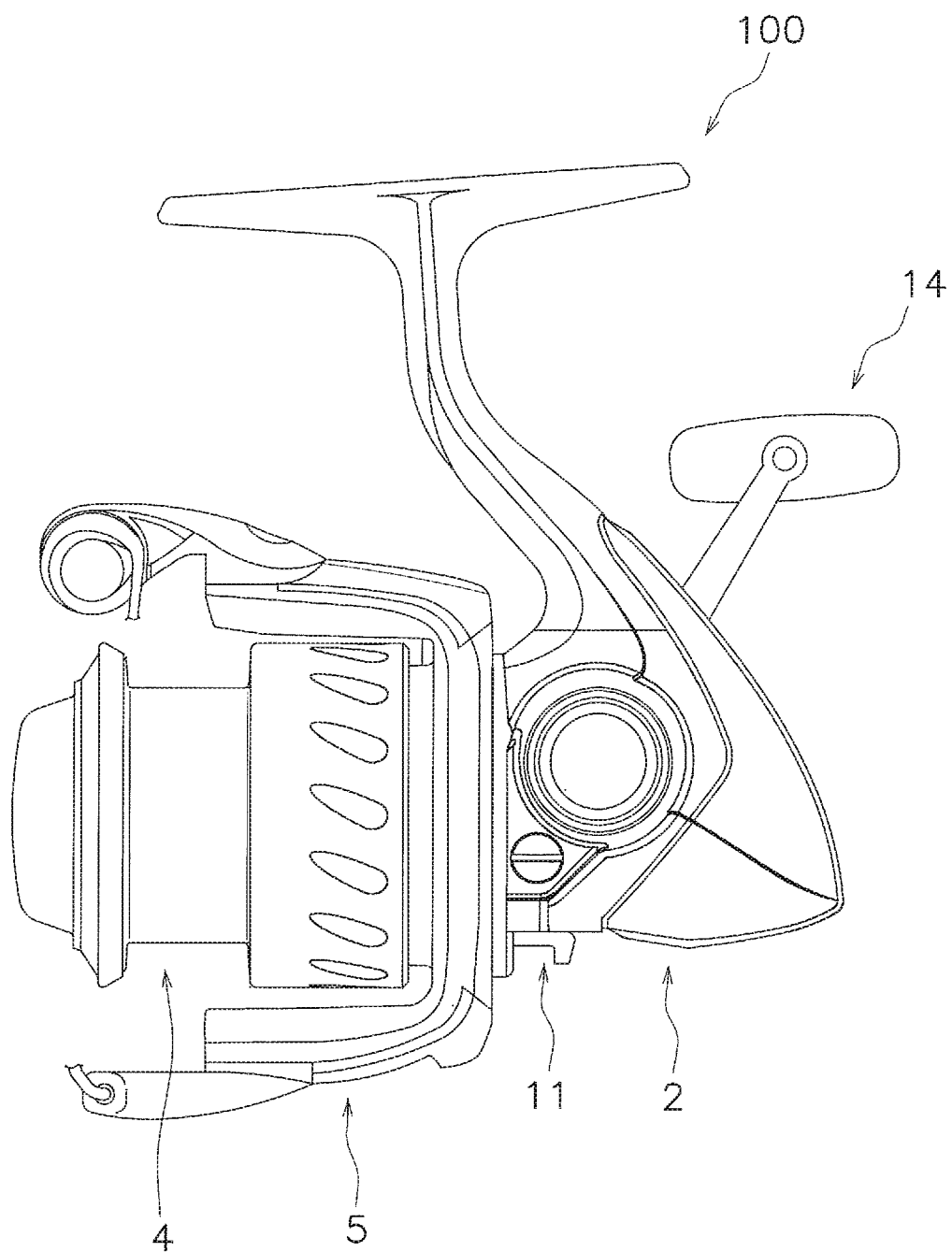
FIG. 1 is a side view of a spinning reel employing one embodiment of the present invention.
Figure 2:
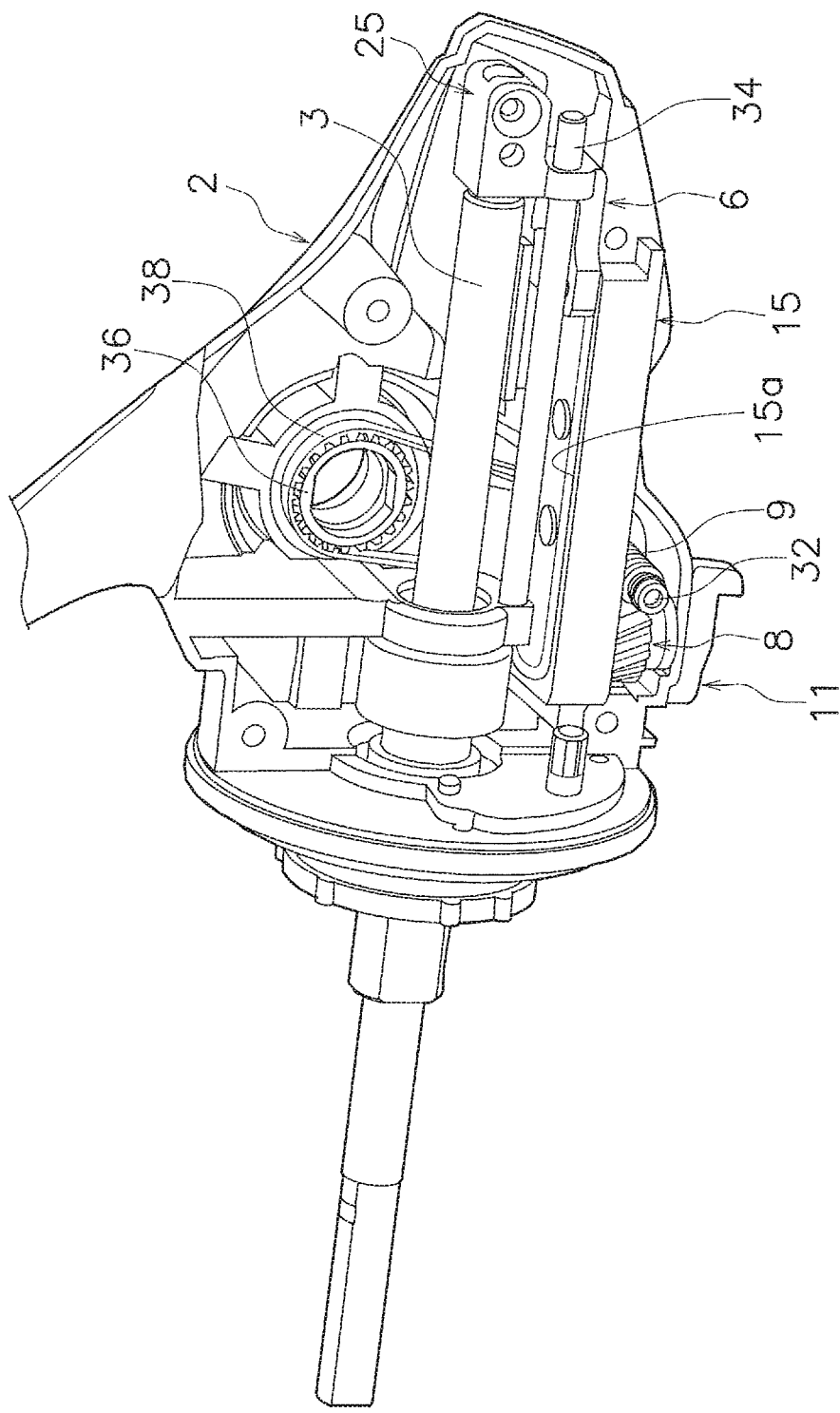
FIG. 2 is a perspective view of the inside of the reel body.
Figure 3:
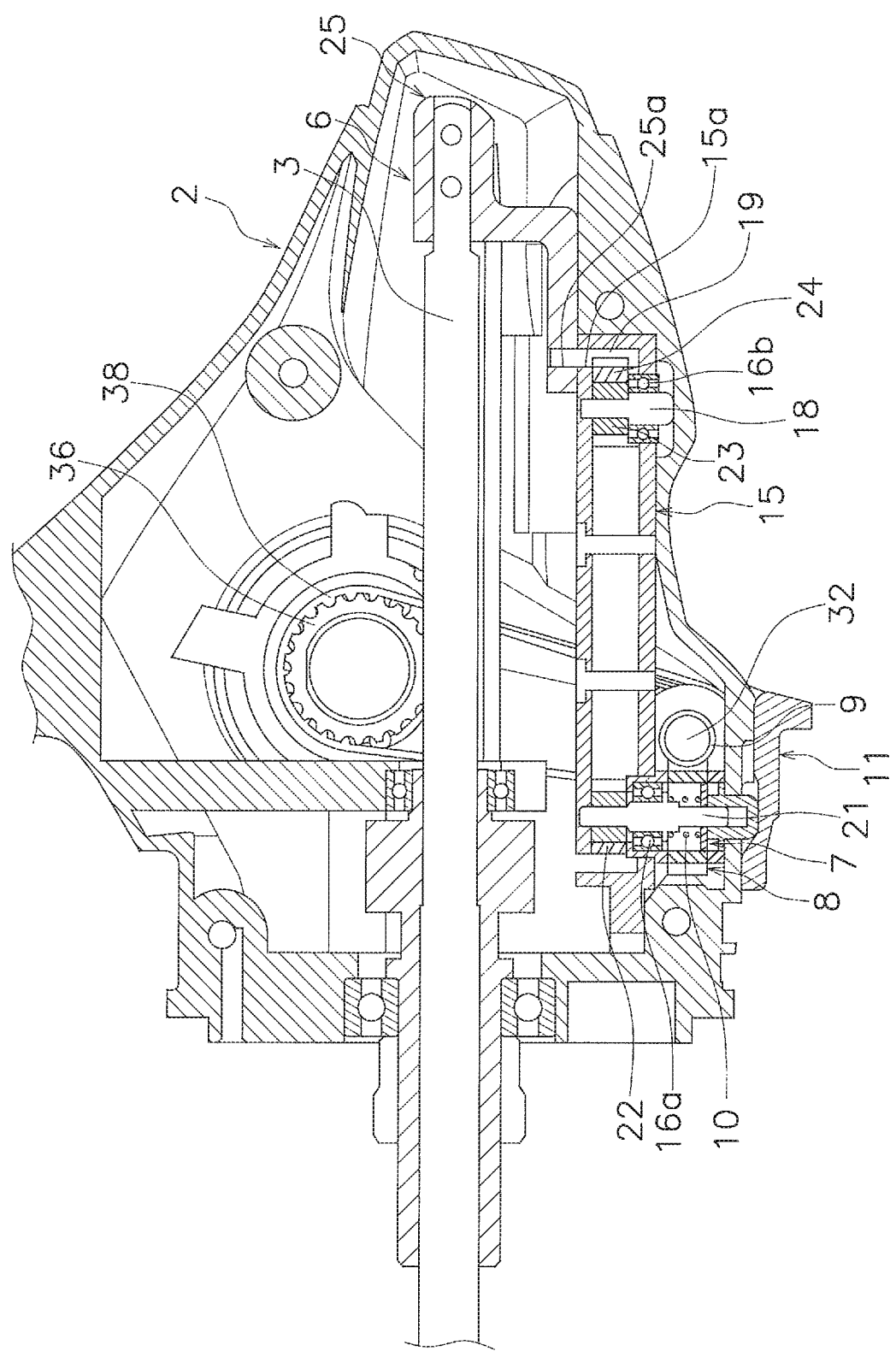
FIG. 3 is a partial longitudinal cross-sectional view of the spinning reel.

As shown in FIGS. 1 to 3, the spinning reel 100 employing one embodiment of the present invention mainly comprises the reel body 2, the spool shaft 3, spool 4, rotor 5, reciprocating mechanism 6, and clutch mechanism 7.

In addition, preferably, the spinning reel 100 further comprises a first gear 8, a driven gear 9, a biasing member 10, and an operation member 11.

As shown in FIG. 1, handle 14 is disposed on the reel body 2 so as to be rotatable. As shown in FIG. 2, the reel body 2 has an internal space, where the internal space houses the reciprocating mechanism 6, a rotor drive mechanism, not shown, that transmits the rotation of the handle 14 to the rotor 5, etc.

The spool shaft 3 is supported by the reel body 2, extending in the longitudinal direction. In particular, the spool shaft 3 is supported by the reel body 2 so as to be movable in the axial direction.

The spool 4 is a member, around the outer periphery of which the fishing line is wound. The spool 4 is attached to the distal end of the spool shaft 3 and moves in the axial direction together with the spool shaft 3.

The rotor 5 is supported by the reel body 2 so as to be rotatable. The rotor 5 rotates about the spool 4 by rotation of the handle 14 and winds the fishing line around the spool 4.

When the rotation of the handle 14 is transmitted to the reciprocating mechanism 6, the reciprocating mechanism 6 moves the spool shaft 3 back and forth in the axial direction. The reciprocating mechanism 6 allows the spool shaft 3 to move in the axial direction when the clutch mechanism 7 is in the non-transmitting state (the state in which the rotation of the handle 14 is not transmitted to the reciprocating mechanism 6).

As shown in FIG. 3, the reciprocating mechanism 6 includes a shaft member 21, a first pulley 22, a second pulley 23, a rotation transmission body 24, and a moving body 25. The first pulley 22, the second pulley 23, and the rotation transmission body 24 are disposed inside a housing 15 housed in the internal space of the reel body 2.

The shaft member 21 extends in a direction intersecting the spool shaft 3 and is rotatably supported by the reel body 2. In the present embodiment, the shaft member 21 extends in the vertical direction and is rotatably supported by the housing 15 via a shaft bearing 16a disposed in the housing 15.

The first pulley 22 is rotatably supported by the shaft member 21 and receives the rotation of the handle 14 when the clutch mechanism 7 is in the transmitting state. The first pulley 22 is a spur gear, for example, and has a plurality of gear teeth, not shown, on the outer periphery thereof. In the present embodiment, the first pulley 22 rotates integrally with the shaft member 21 by, for example, a non-circular engagement of the inner circumferential part the first pulley 22 with the outer peripheral part of the shaft member 21.

The second pulley 23 is disposed rearward of the first pulley 22, spaced apart from the first pulley 22 in the axial direction. The second pulley 23 integrally rotates with rotational shaft 18 that is rotatably supported by the housing 15. The rotational shaft 18 is rotatably supported by the housing 15 via a shaft bearing 16b disposed in the housing 15. The rotational shaft 18 is disposed parallel to the shaft member 21. The second pulley 23 is a spur gear, for example, and has a plurality of gear teeth, not shown, on the outer periphery thereof.

The rotation transmission body 24 is bridged between the first pulley 22 and the second pulley 23 and moves in a circular motion as the first pulley 22 rotates. In particular, the rotation transmission body 24 is an annular belt member and has engagement teeth, not shown, that engage the plurality of gear teeth of the first pulley 22 and the second pulley 23. The rotation transmission body 24 thereby moves in a circle about the first pulley 22 and the second pulley 23 as the shaft member 21 rotates.

The moving body 25 engages the rotation transmission body 24 and moves back and forth in the axial direction integrally with the spool shaft 3 as the rotation transmission body 24 moves in a circular motion. The moving body 25 is fixed to the rear-end portion of the spool shaft 3. The moving body 25 has guide groove 25a that is extends in the left-right direction.

An engagement pin 19 that is fixed to the outer peripheral part of the rotation transmission body 24 engages with the guide groove 25a. The engagement pin 19 protrudes upwardly from a guide hole portion 15a that is formed in the housing 15 and engages the guide groove 25a. As shown in FIG. 2, the guide hole portion 15a is formed essentially in the shape of a track, in which two parallel straight lines are connected by two half arcs. The engagement pin 19 moves inside the guide groove 25a and the guide hole portion 15a as the rotation transmission body 24 moves in a circular motion, and the spool shaft 3 thus moves back and forth in the axial direction together with the moving body 25. That is, the spool 4 moves back and forth in the axial direction as the rotation transmission body 24 moves in a circular motion. The movement of the moving body 25 in the axial direction is supported by a guide shaft 34 that is disposed parallel to the spool shaft 3.

The clutch mechanism 7 is capable of being switched between the transmitting state for transmitting the rotation of the handle 14 to the reciprocating mechanism 6 and the non-transmitting state for terminating the transmission. In the present embodiment, the clutch mechanism 7 is disposed between the first gear 8 and the shaft member 21.

Figure 4:
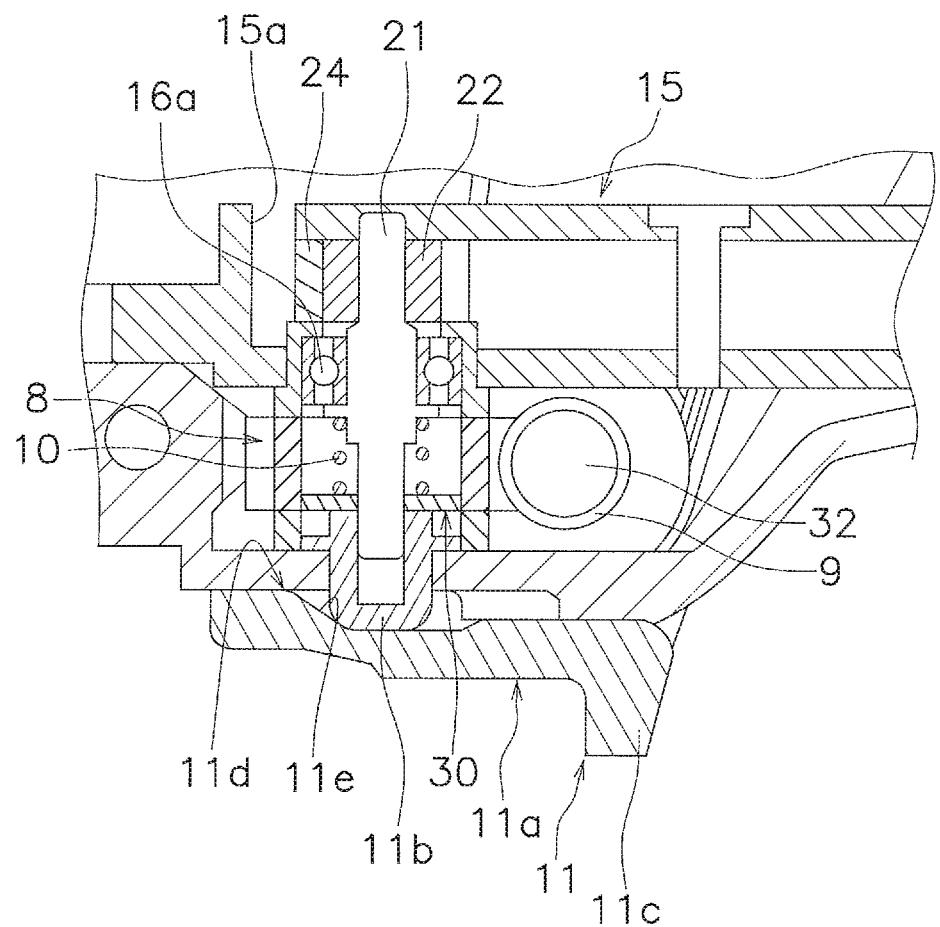
FIG. 4 is a partial longitudinal cross-sectional view of the clutch mechanism in the transmitting state.
Figure 5:
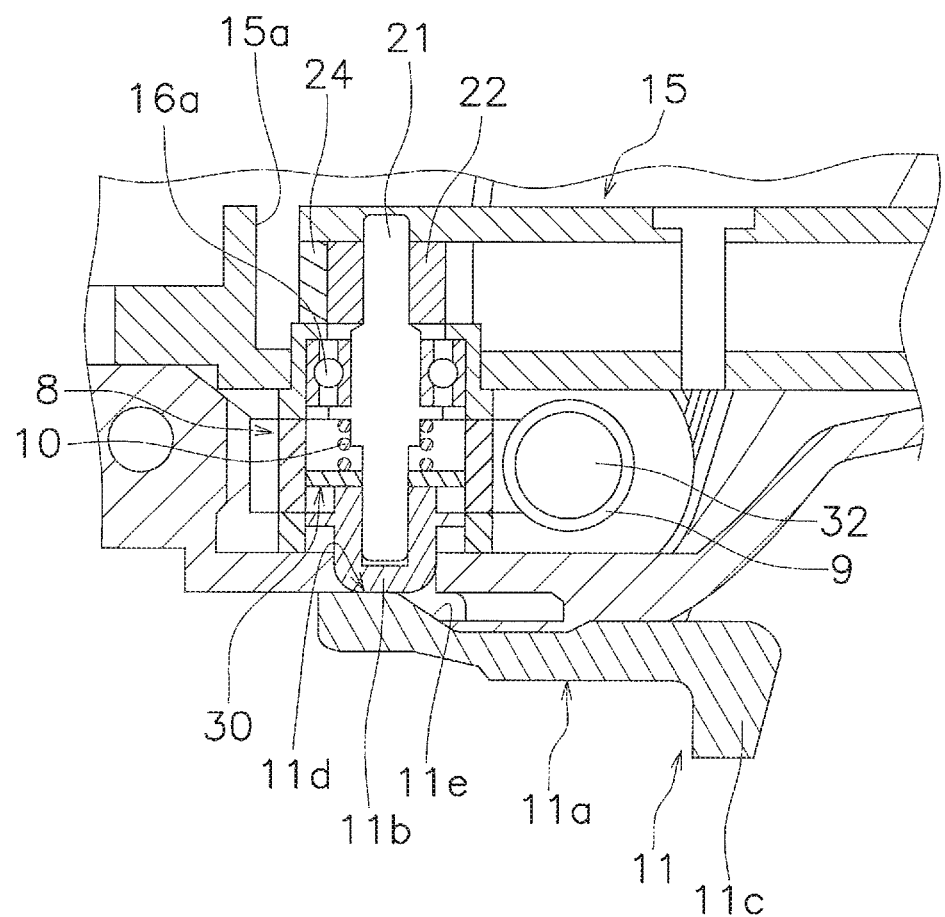
FIG. 5 is a partial longitudinal cross-sectional view of the clutch mechanism in the non-transmitting state.

As shown in FIGS. 4 and 5, the clutch mechanism 7 has a connecting member 30. The connecting member 30 is supported by the shaft member 21 so as to be integrally rotatable with the shaft member 21 as well as to be movable relative to the axial direction of the shaft member 21. In the present embodiment, the connecting member 30 is supported by the shaft member 21 so as to be movable in the vertical direction.

The connecting member 30 is disposed on the inner circumferential part of the first gear 8. The connecting member 30 moves between a first position (refer to FIG. 4), in which the connecting member is connected to the first gear 8 so as to be integrally rotatable and a second position (refer to FIG. 5), in which the connection with the first gear 8 is released, in accordance with an operation of the operation member 11.

Figure 6:
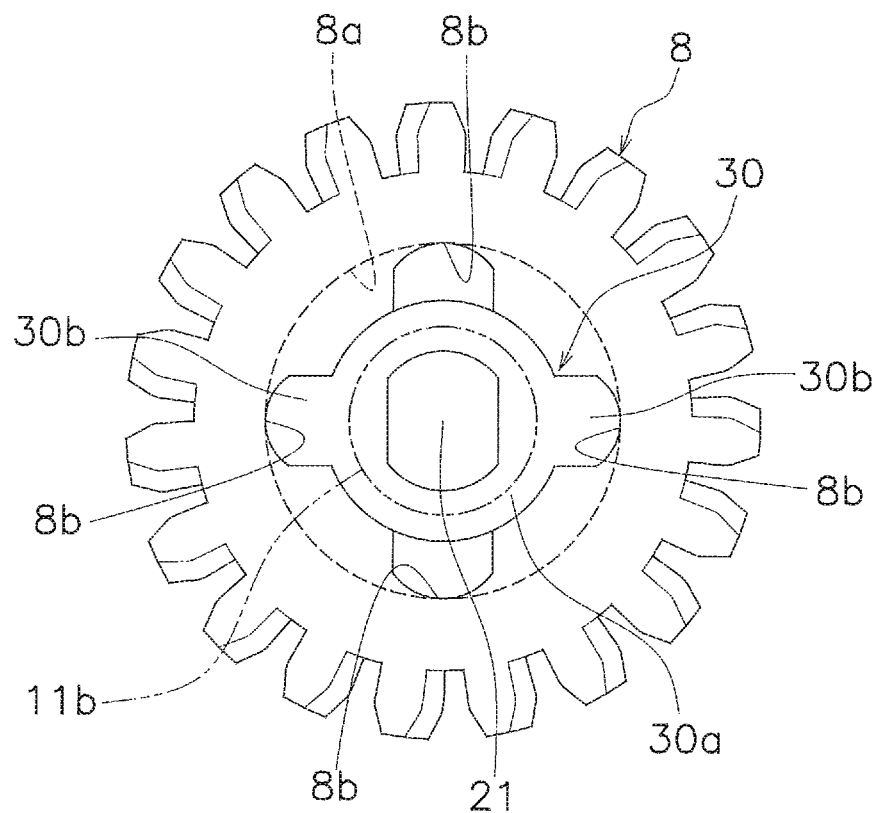
FIG. 6 is a bottom view of the clutch mechanism when the clutch mechanism is in the transmitting state.

FIG. 6 is a bottom view of the clutch mechanism 7 when the clutch mechanism 7 is in the transmitting state, that is, when the connecting member 30 is in the first position. As shown in FIG. 6, the connecting member 30 has an annular portion 30a and an engagement protrusion 30b. The inner circumferential part of the annular portion 30a engages the outer peripheral part of the shaft member 21 in a non-circular manner. The connecting member 30 thereby rotates integrally with the shaft member 21. The engagement protrusion 30b engages an engagement recess 8b of the first gear 8, described further below. A plurality (for example, two) of the engagement protrusions 30b protrude from the outer peripheral part of the annular portion 30a in the radial direction and at 180-degree intervals in the circumferential direction.

The clutch mechanism 7 is formed by the engagement protrusion 30b of the connecting member 30 and the engagement recess 8b of the first gear 8. When the connecting member 30 is in the first position, the clutch mechanism 7 is in the transmitting state and the rotation of the handle 14 is transmitted to the reciprocating mechanism 6. On the other hand, when the connecting member 30 is in the second position, the clutch mechanism 7 is in the non-transmitting state and the rotation of the handle 14 is not transmitted to the reciprocating mechanism 6.

The first gear 8 can be rotated about the axis of the shaft member 21, and the rotation of the handle 14 is transmitted thereto. The shaft member 21 penetrates the center of the first gear 8. The first gear 8 is a helical gear and decelerates and transmits the rotation of the driven gear 9 to the first pulley 22 via the shaft member 21 when the clutch mechanism 7 is in the transmitting state.

As shown in FIG. 6, the first gear 8 has a housing hole portion 8a and the engagement recess 8b. The housing hole portion 8a is formed with a circular shape and can house the connecting member 30 when the clutch mechanism 7 is in the non-transmitting state, that is, when the connecting member 30 is in the second position. The engagement recess 8b is formed continuously with the housing hole portion 8a on the inner circumferential part of the first gear 8. In particular, a plurality (for example, four) of the engagement recesses 8b are disposed on the inner circumferential edge part of the first gear 8 at 90-degree intervals in the circumferential direction.

The engagement recess 8b engages the engagement protrusion 30b of the connecting member 30 when the connecting member 30 is in the first position. The first gear 8 thereby rotates integrally with the connecting member 30. That is, when the connecting member 30 is in the first position, the rotation of the handle 14 is transmitted to the first pulley 22 via the first gear 8, the connecting member 30, and the shaft member 21. On the other hand, when the connecting member 30 is in the second position, the engagement between the engagement recess 8b and the engagement protrusion 30b of the connecting member 30 is released, and the rotation of the first gear 8 is not transmitted to the connecting member 30. That is, when the connecting member 30 is in the second position, the shaft member 21 enters a state of being freely rotatable relative to the first gear 8, and the rotation of the handle 14 is not transmitted to the shaft member 21.

As shown in FIGS. 2 and 3, the driven gear 9 is rotatably supported by the reel body 2. The driven gear 9 meshes with the first gear 8 and transmits the rotation of the handle 14 to the first gear 8. The driven gear 9 is integrally provided on a gear shaft 32 that extends in the left-right direction. The rotation of the handle 14 is transmitted to the gear shaft 32 by a rotation transmission body 38 that is bridged between the gear shaft 32 and a gear 36 that rotates integrally with a handle shaft (not shown).

As shown in FIGS. 3 to 5, the biasing member 10 biases the connecting member 30 of the clutch mechanism 7 toward the first position. In one embodiment the biasing member 10 is a coil spring, for example, and is attached to the outer periphery of the shaft member 21 in a compressed state. In addition, the biasing member 10 is disposed on the inner circumferential part of the first gear 8.

The operation member 11 is configured to switch between the transmitting state and the non-transmitting state of the clutch mechanism 7. As shown in FIGS. 4 and 5, the operation member 11 has a lever member 11a and a moving member 11b.

The lever member 11a is disposed in the lower portion of the reel body 2 so as to be slidable in the longitudinal direction. The lever member 11a has a finger hooking portion 11c and a sliding portion 11d. The finger hooking portion 11c is formed so as to protrude downwards at the rear portion of the lever member 11a.

The sliding portion 11d slides to the moving member 11b in accordance with a sliding operation of the lever member 11a and moves the moving member 11b in the vertical direction. The sliding portion 11d is formed in the upper portion of the lever member 11a. The sliding portion 11d has an inclined part 11e that is inclined in a direction away from the reel body 2 as the sliding portion extends rearwardly.

The moving member 11b moves the connecting member 30 in accordance with the movement of the lever member 11a. The moving member 11b is a member with a bottomed tubular shape and is attached to a lower end portion of the shaft member 21 so as to be rotatable, as well as to be movable in the vertical direction. As shown in FIG. 4, when the clutch mechanism 7 is in the transmitting state, the lower portion of the moving member 11b protrudes downwards from the reel body 2 and is capable of contacting the sliding portion 11d. In addition, the upper portion of the moving member 11b is in contact with the annular portion 30a of the connecting member 30.

When the operation member 11 is slid rearward from the position as shown in FIG. 4, the moving member 11b slides on the inclined part 11e and is pushed upwards. As a result, the connecting member 30 moves from the first position to the second position, the engagement protrusion 30b of the connecting member 30 is disengaged from the engagement recess 8b of the first gear 8, and the clutch mechanism 7 is switched from the transmitting state to the non-transmitting state.

When the operation member 11 is slid forward from the position shown in FIG. 5, if the engagement protrusion 30b of the connecting member 30 is in a position overlapping the engagement recess 8b of the first gear 8 in a plan view, the moving member 11b slides on the inclined part 11e and is pushed downwards by the biasing member 10. As a result, the connecting member 30 moves from the second position to the first position, the engagement protrusion 30b of the connecting member 30 engages the engagement recess 8b of the first gear 8, and the clutch mechanism 7 is switched from the non-transmitting state to the transmitting state.

If, on the other hand, the engagement protrusion 30b of the connecting member 30 is not in a position overlapping the engagement recess 8b of the first gear 8 in a plan view, the clutch mechanism 7 is not switched from the non-transmitting state to the transmitting state, even if the operation member 11 is slid forward. However, in the present embodiment, since the connecting member 30 is biased toward the first position by the biasing member 10, when the first gear 8 is rotated by rotating the handle 14, the engagement protrusion 30b of the connecting member 30 automatically engages with the engagement recess 8b of the first gear 8. The clutch mechanism 7 thereby switches from the non-transmitting state to the transmitting state.

In the spinning reel 100 configured as described above, when the clutch mechanism 7 is in the non-transmitting state, the rotation of the handle 14 is not transmitted to the shaft member 21. That is, when the clutch mechanism 7 is in the non-transmitting state, the first pulley 22 is in a freely rotatable state, and the reciprocating mechanism 6 allows the spool shaft 3 to move in the axial direction. Specifically, for example, when moving the spool 4 in the axial direction is attempted by pinching the spool 4 with a finger, the movement of the engagement pin 19 is guided by the guide groove 25a of the moving body 25 and the rotation transmission body 24 moves with a circular motion by the movement of the engagement pin 19. Thus, since the position of the spool 4 relative to the rotor 5 can be adjusted without rotating the handle 14, it is possible to suppress contact of the fishing line with the rotor 5 during casting. Moreover, even if the rotor 5 is moved to the foremost position, since the hanging length of the tackle changes only by the distance that the spool 4 is moved forward, it is possible to cast with the optimal hanging length.

In addition, since the present embodiment is configured such that the moving body 25 moves back and forth as the rotation transmission body 24 moves with a circular motion, compared to the case in which, for example, the moving body 25 is moved back and forth by the rotation of a worm shaft in which a spiral groove is formed, it is possible to form the clutch mechanism 7 with a simple configuration. In addition, when the clutch mechanism 7 is in the non-transmitting state, it is possible to easily adjust the position of the spool 4 relative to the rotor 5 without a complex operation, such as rotation of a worm shaft. Moreover, during casting, even when the spool 4 is moved to the foremost position, it is not necessary to return the moved spool 4 to the original position after casting.

OTHER EMBODIMENTS

One embodiment of the present invention is described above, but the present invention is not limited to the above-described embodiment, and various modifications can be made without departing from the scope of the invention. Specifically, the various embodiments and modified examples described in the present Specification can be combined in any required manner.

In the embodiment described above, the lever member 11a is disposed in the operation member 11, but it is not necessary to include the lever member 11a. For example, the present invention may be configured such that the clutch mechanism 7 can be switched from the transmitting state to a released (i.e. a non-transmitting) state by pushing the moving member 11b up with a finger. At this time, the connecting member 30 may be integrally provided on the moving member 11b.

In the embodiment described above, the connecting member 30 and the operation member 11 are formed as separate members, but the connecting member 30 may be integrally disposed on the operation member 11.

In the embodiment described above, the shaft member 21 extends in the vertical direction, but the shaft member 21 may extend in the left-right direction so as to be parallel to the handle shaft.

In the embodiment described above, the clutch mechanism 7 is disposed between the first gear 8 and the shaft member 21, but the clutch mechanism 7 may be disposed between the first pulley 22, for example, and the shaft member 21.

The rotation of the handle 14 is transmitted to the first gear 8 via the rotation transmission body 38, but the rotation of the handle 14 may be transmitted to the first gear 8, for example, via a plurality of gear members that mesh with each other.

What is claimed is:

1. A spinning reel, comprising:
   a reel body;
   a handle disposed on the reel body so as to be rotatable;
   a spool shaft supported by the reel body;
   a spool configured to move in an axial direction of the spool shaft together with the spool shaft;
   a rotor configured to rotate about the spool by rotation of the handle and wind a fishing line around the spool;
   a reciprocating mechanism configured to move the spool shaft back and forth in the axial direction when the rotation of the handle is transmitted thereto; and
   a clutch mechanism configured to be switched between a transmitting state to transmit the rotation of the handle to the reciprocating mechanism and a non-transmitting state to terminate the transmission,
   the reciprocating mechanism enabling the spool shaft to move in the axial direction when the clutch mechanism is in the non-transmitting state.

2. The spinning reel according to claim 1, wherein the reciprocating mechanism comprises
   a shaft member configured to receive the rotation of the handle, extending in a direction intersecting the spool shaft, and being rotatably supported by the reel body, a first pulley rotatably supported by the shaft member and receiving the rotation of the handle when the clutch mechanism is in the transmitting state, a second pulley disposed spaced apart from the first pulley in the axial direction of the spool shaft, a rotation transmission body bridged between the first pulley and the second pulley and configured to move in a circular motion as the first pulley rotates, and a moving body configured to engage the rotation transmission body and integrally move back and forth in the axial direction with the spool shaft as the rotation transmission body moves in a circular motion.

3. The spinning reel according to claim 2, further comprising a first gear to which the rotation of the handle is transmitted and configured to be rotated about an axis of the shaft member, the first pulley integrally rotating with the shaft member, and the clutch mechanism being disposed between the first gear and the shaft member.

4. The spinning reel according to claim 3, further comprising an operation member to switch between the transmitting state and the non-transmitting state of the clutch mechanism, the clutch mechanism includes a connecting member supported by the shaft member so as to be integrally rotatable and configured to move between a first position, in which the connecting member is connected with the first gear so as to be integrally rotatable, and a second position, in which the connection with the first gear is released, in accordance with an operation of the operation member.

5. The spinning reel according to claim 4, further comprising a biasing member mounted on the shaft member and configured to bias the connecting member of the clutch mechanism toward the first position.

6. The spinning reel according to claim 4, wherein the first gear has a housing hole portion configured to accommodate the connecting member when the clutch mechanism is in the non-transmitting state and an engagement recess continuously formed with the housing hole portion, and the connecting member of the clutch mechanism has an engagement protrusion configured to engage the engagement recess of the first gear.

7. The spinning reel according to claim 4, wherein the operation member includes a lever member disposed in the reel body so as to be movable and a moving member configured to move the connecting member in accordance with a movement of the lever member.

8. The spinning reel according to claim 4, wherein the connecting member is integrally disposed on the operation member.

9. The spinning reel according to claim 3, further comprising a driven gear supported by the reel body so as to be rotatable and configured to engage the first gear to transmit the rotation of the handle to the first gear, the first gear is configured to decelerate and transmit the rotation of the driven gear to the first pulley via the shaft member.

* * * * *